United States Patent [19]

Takahashi

[11] Patent Number: 5,897,382

[45] Date of Patent: Apr. 27, 1999

[54] PIVOTALLY MOVABLE ELECTRICAL CONNECTOR AND ELECTRONIC APPARATUS USING SAME

[75] Inventor: Seiji Takahashi, Tokyo, Japan

[73] Assignee: Yokowo Co., Ltd., Tokyo, Japan

[21] Appl. No.: 08/861,070

[22] Filed: May 21, 1997

[30] Foreign Application Priority Data

May 23, 1996 [JP] Japan ................................ 8-151542

[51] Int. Cl.$^6$ ................................................ H01R 39/00
[52] U.S. Cl. ........................................... 439/31; 361/729
[58] Field of Search ............................. 439/31, 23, 24, 439/13; 361/729

[56] References Cited

U.S. PATENT DOCUMENTS 5,237,488  8/1993  Moser et al. .............................. 439/31

FOREIGN PATENT DOCUMENTS 440488  4/1992  Japan .
573894  10/1993  Japan .
587626  11/1993  Japan .

OTHER PUBLICATIONS

Explanation of the three Japanese Laid-Open Utility Model Publications listed above.

Primary Examiner—Steven L. Stephan
Assistant Examiner—Eugene G. Byrd

[57] ABSTRACT

A connector having capable of pivotal movement comprises a first member constituted by a shaft made of an insulating material and having a convex rounded or arcuate portion. One end of the shaft is secured. A second member is mounted for pivotal movement about the periphery of a rounded portion of the shaft adjacent the other end thereof. A plurality of electrodes, which may comprise parallel thin strip-like conductors concentric with the pivot axis, are provided on the periphery of the rounded portion of the shaft. The second member supports a plurality of spring-biased electrical contacts each having an element thereof urged into contact with one of the electrodes.

27 Claims, 9 Drawing Sheets

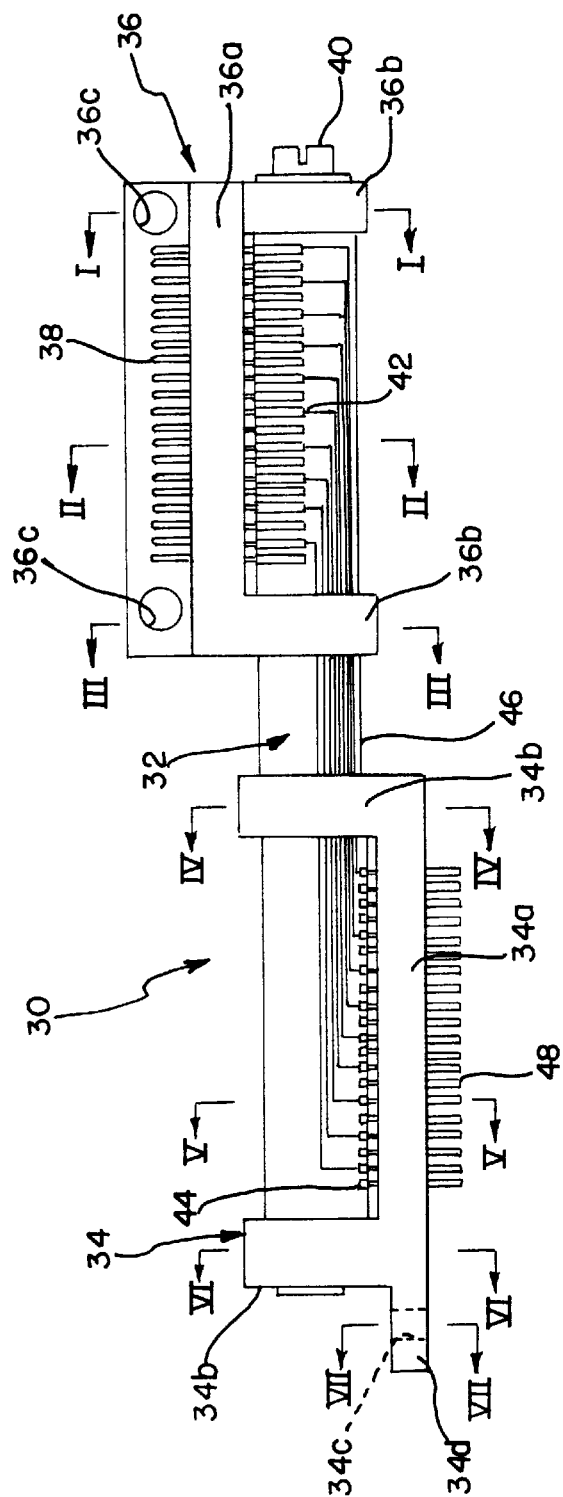
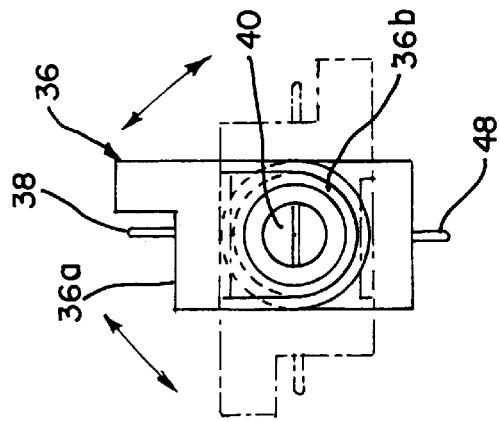
FIG. 1
FIG. 2
FIG. 3

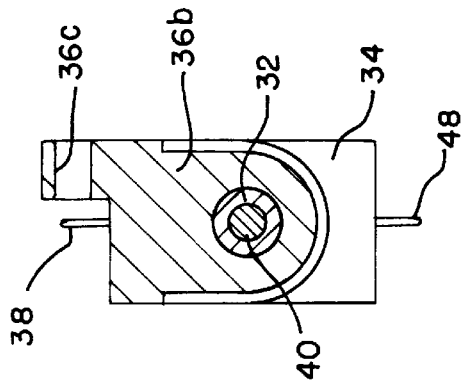
FIG. 4
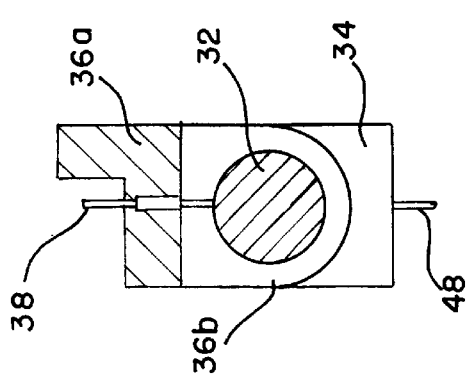
FIG. 5
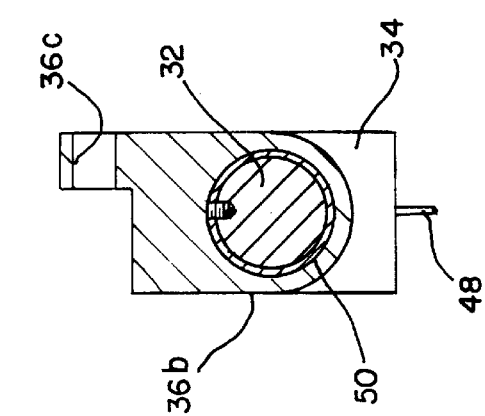
FIG. 6
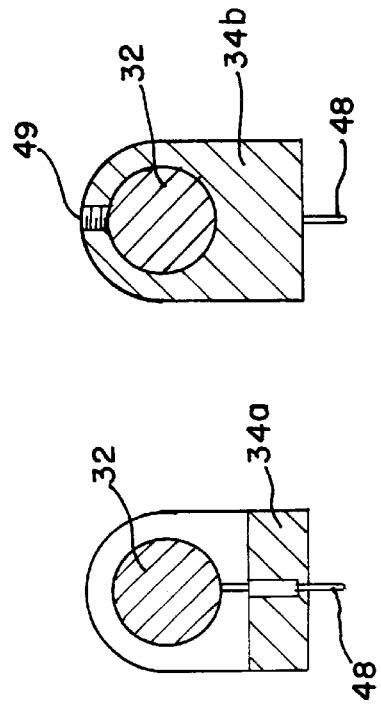
FIG. 7
FIG. 8
FIG. 9
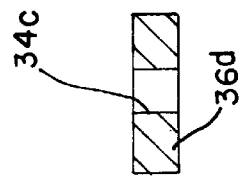
FIG. 10

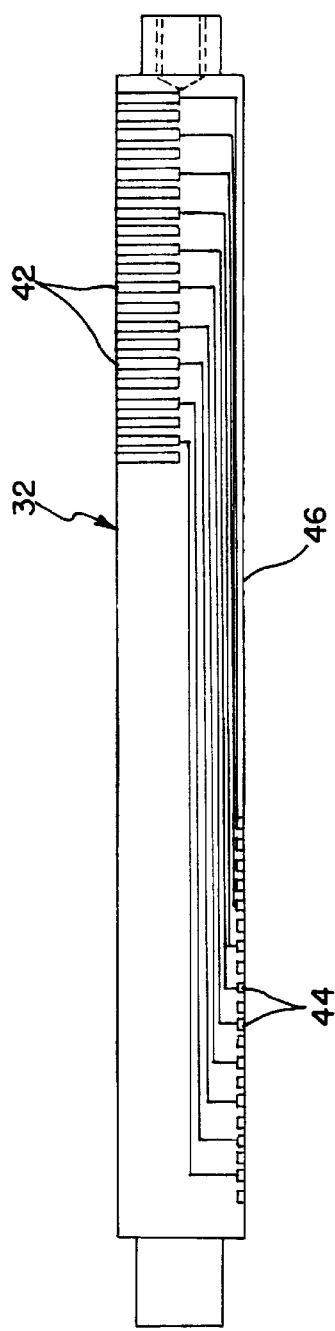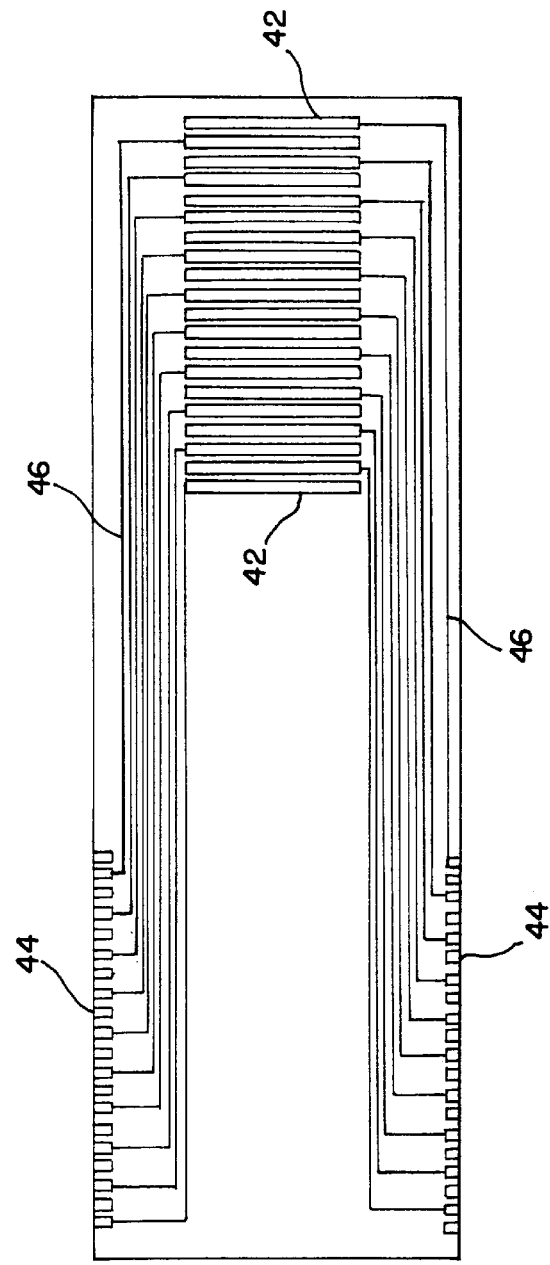

PIVOTALLY MOVABLE ELECTRICAL CONNECTOR AND ELECTRONIC APPARATUS USING SAME

BACKGROUND OF THE INVENTION

The present invention relates to electrical connectors which are capable of pivotal, or rocking, movement. The present invention also relates to an electronic apparatus employing such connectors.

Note-type electronic apparatuses, such as lap-top personal computers, word processors, portable telephone sets, personal digital assistants, etc., typically include a housing in which electronic components such as a central processing unit are provided, and a lid in which electronic components such as a liquid crystal display are provided and which is hinged to the housing and able to open and close the same. In such an electronic apparatus, an electronic component provided in the housing and a different electronic component provided in the lid may be electrically connected to each other by a plurality of cables which are bundled and led along the hinge axis. The housing has a power switch, which is depressed and turned off by the lid to disconnect the power source of the electronic apparatus when the lid is closed.

In these types of prior art apparatuses, the cables are twisted whenever the lid is opened and closed, and may be broken due to such causes as metal fatigue. Moreover, in recent color liquid crystal displays, larger numbers of electric signals are involved, which require larger numbers of cables. Cable bundles that are used are therefore increased in diameter, thus increasing the extent of twisting and stretching of the cables and curtailing the life thereof.

OBJECTS AND SUMMARY OF THE INVENTION

Accordingly, it is an object of the present invention is to provide an electrical connector capable of pivotal movement which is suitable for electrically connecting electronic components provided in members which are hinged to each other.

It is another object of the present invention to provide such an electrical connector and which can eliminate the possibility of breakage of the electrical connection due to pivoting or rocking of the two members relative to each other.

The foregoing objects of the present invention and others as well are attained by providing an electrical connector comprising: a first member; a second member mounted for pivotal movement relative to the first member about a pivot axis; a plurality of mutually insulated first electrodes provided on the first member, each of the first electrodes having a convex arcuate profile which is concentric with the pivot axis; and a plurality of electrical contacts provided on the second member, each of the electrical contacts having an element thereof which is urged into engagement with one of the first electrodes.

The objects of the present invention are also attained by providing an electronic apparatus comprising a housing accommodating first electronic components and a lid accommodating other electronic components, the lid being hinged to the housing for opening and closing movement about a hinge axis, and an electrical connector for effecting electrical connections between the first electronic components and the other electronic components, the electrical connector comprising: a first member fastened to the housing; a second member fastened to the lid and mounted for pivotal movement relative to the first member about a pivot axis which is coincident with the hinge axis; a plurality of mutually insulated first electrodes provided on the first member, each of the first electrodes having a convex arcuate profile which is concentric with the pivot axis; means for electrically connecting the first electrodes to the first electronic components; a plurality of electrical contacts provided on the second member, each of the electrical contacts having an element thereof which is urged into engagement with one of the first electrodes; and means for electrically connecting the second electrodes to the other electronic components.

The above and other objects, features and advantages of the invention will become more apparent from the detailed description of the preferred embodiments when the same is read with reference to the accompanying drawings.

BRIEF DESCRIPTION OF THE DRAWINGS

FIG. 1 is a front view showing one embodiment of the electrical connector according to the present invention;

FIGS. 2 and 3 are a left and a right side view, respectively, taken in FIG. 1;

FIGS. 4 to 10 are sectional views taken along lines A—A to G—G, respectively, in FIG. 1;

FIG. 11 is a front view of the shaft shown in Fig 1;

FIG. 12 is a developed view showing a conductor pattern provided on the outer periphery of the shaft shown in FIG. 11;

DETAILED DESCRIPTION OF PREFERRED EMBODIMENTS

Figure 13:
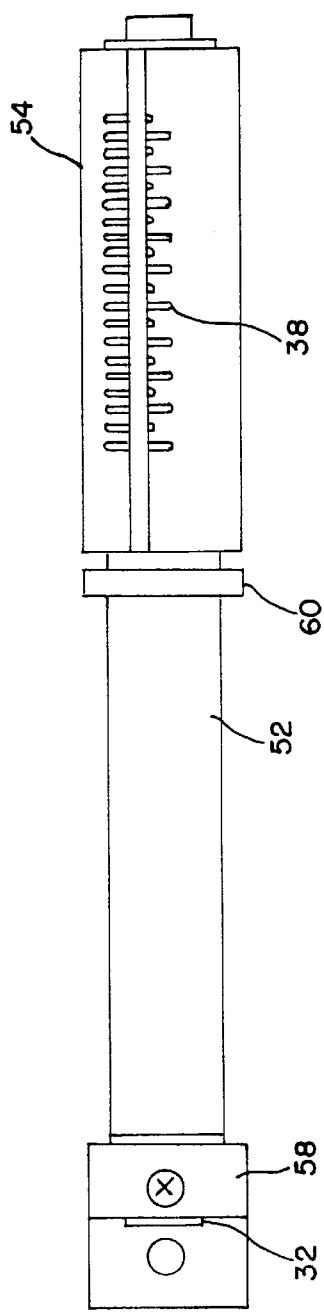
FIG. 13 is a plan view showing a different embodiment of the electrical connector according to the present invention.

One embodiment of the connector 30 will now be described with reference to FIGS. 1 to 12. The connector 30 comprises a shaft 32 made of an insulating material. The shaft 32 serves as a first member and is secured at a first end to a stationary base 34. A second member 36 made of an insulating material, is coupled to a cylindrical portion of the shaft 32 adjacent the cantilevered other end thereof such that it can be pivoted or rocked about the shaft 32.

The second member 36 has a pin support portion 36a having a substantially L-shaped sectional profile, and opposite end arm portions 36b which are coupled to the other end portion of the shaft 32 for pivoting thereabout. As shown in FIG. 5, the inner surface of the pin support portion 36a faces the outer peripheral surface of the shaft 32 with a clearance provided between the two surfaces. The pin support portion 36a supports a plurality of electrical contacts in the form of spring-biased electrical connector pins 38, which are arranged in a row extending along the pivot axis and are disposed such that their free ends are urged into engagement with the outer periphery of the shaft 32. The pin support portion 36a has mounting holes 36c which may be used for securing the second member 36 to the hinged lid of an electronic apparatus or the like with screws or the like. Reference numeral 40 in FIGS. 1 and 3 designates a retaining screw.

As shown in FIG. 12, a conductor pattern of a thin conductor film or the like, is formed by means of etching or deposition techniques on the outer periphery of the shaft 32 shown in FIG. 11. The conductor pattern has a plurality of thin strip-like parallel electrodes 42, which are formed on the outer peripheral portion of the shaft 32 adjacent the other end noted above. The electrodes 42 subtend an angular range through which the second member 36 is pivoted relative to the shaft 32, i.e., a range in which the connector pins 38 are in contact with the respective electrodes 42. The angular range could be, for example, a range of 90 degrees in each of the forward and rearward directions. A plurality of like thin strip-like parallel electrodes 44 are formed on an outer peripheral portion of the shaft 32 adjacent the first end thereof as noted above. The electrodes 42 and 44 formed on the opposite end outer peripheral portions of the shaft 32, are interconnected by conductors 46 of the pattern formed on and along the outer periphery of the shaft 32.

The stationary member 34 has a pin support portion 34a and stationary arm portions 34b provided at opposite ends of the pin support portion 34a. The shaft 32 has its portion adjacent the first end as noted above secured to the stationary arm portions 34b. As shown in FIGS. 7 and 9, for instance, the first end portion of the shaft 32 is inserted through the stationary arm portions 34b and secured to the same by tightening set screws 49 so that it is fixed relative to the stationary base 34. The pin support portion 34a supports a plurality of parallel spring-biased electrical connector pins 48, which are arranged in a row extending in general alignment with the pivot axis and are in wiping engagement with the respective electrodes 44 provided on the outer periphery of the shaft 32. As shown in FIGS. 1 and 10, the stationary base 34 has an extension 34d, which extends from one end and has a hole 34c for securing the stationary base 34 to the electronic apparatus housing or the like. As shown in FIG. 6, to protect the conductors 46 of the conductor pattern formed on and along the outer periphery of the shaft 32 from being worn out by pivoting movement of the inner end arm portion 36b of the second member 36, a protective ring 50 made of an insulating material is secured by means of a screw to the shaft 32, and the inner end arm portion 36b is fitted on the ring 50.

Figure 19:
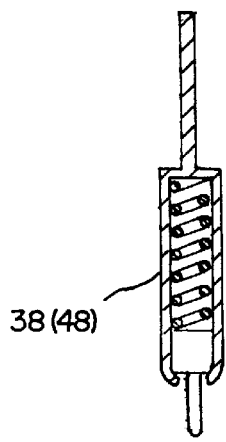
FIG. 19 is a sectional view showing an example of a spring-biased electrical contact member.
Figure 20:
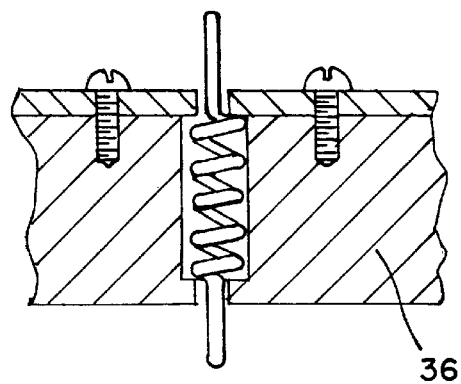
FIG. 20 is a sectional view showing a different example of spring-biased electrical contact member.

The spring-biased connector pins 38 and 48 may be of various constructions. In the example shown in FIG. 19, a contact probe made of a conductive member and a spring are inserted in a conductive sleeve. The sleeve is constricted at ends to retain the contact probe while permitting movement thereof. FIG. 20 shows another example of a connector pin in which a resilient flexible conductor wire is formed into a coiled spring portion between opposite end straight portions. The coiled portion is inserted in a hole formed in the second member 36 and is retained by a plate or the like, so that one end straight portion projecting from the second member 36 is urged into engagement with the associated electrode 42. As a further alternative, a resilient flexible conductor strip may be folded to form a zig-zag portion between opposite end straight portions.

The connector pins 38 which are mounted in the second member 36 in either way as described above, are urged against and are electrically connected to the respective electrodes 42 provided on the outer periphery of the shaft 32 while the second member 36 is pivoted relative thereto. In other words, when the second member 36 is at any pivotal position, the connector pins 38 are electrically connected through the electrodes 42, the conductors 46 and the electrodes 44 of the conductor pattern to the connector pins 48 provided in the stationary member 34. The connector 30 thus can function as an electrical connector which accommodates pivotal movement.

Figure 14:
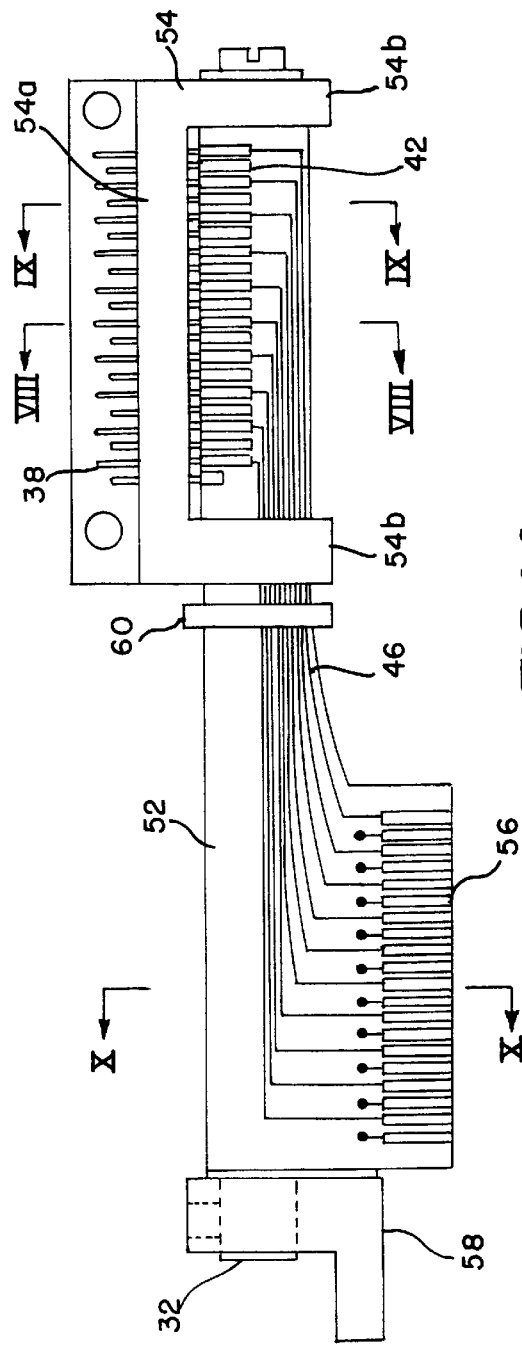
FIG. 14 is a front view showing the electrical connector shown in FIG. 13.
Figure 15:
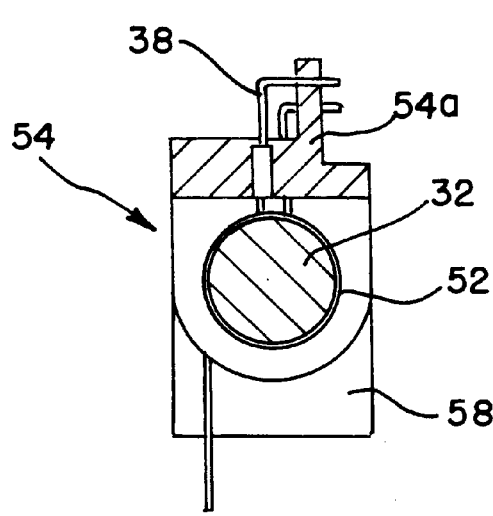
FIGS. 15 to 17 are sectional views taken along lines H—H to J—J, respectively, in FIG. 14.
Figure 16:
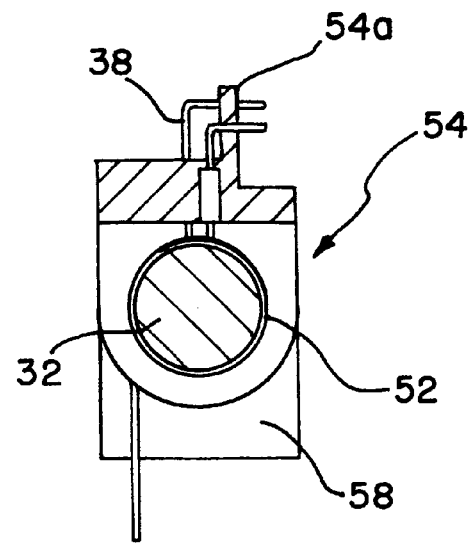
Figure 17:
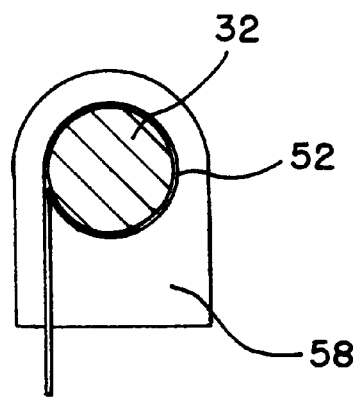

Another embodiment of the connector according to the invention will now be described with reference to FIGS. 13 to 18. In this embodiment, a flexible insulating board 52 is provided on the outer periphery of shaft 32. As shown in the developed view of FIG. 18, the flexible insulating board 52 is shaped like a letter L, with a wider portion adjacent one end. The wider portion is wrapped about one end portion of the shaft 32 by approximately 270 degrees, as shown in FIG. 17, while the remaining portion of the flexible insulating board 52 is wrapped about the other end portion of the shaft 32 by 360 degrees, as shown in FIGS. 15 and 16.

Second member 54 has arm portions 54b mounted for rocking over the narrower portion of the flexible insulating board 52, which is wrapped about the cylindrical other end portion of the shaft 32. The second member 54 includes a pin support portion 54a. As shown in FIG. 13, the pin support portion 54a supports a plurality of spring-biased electrical connector pins 38 which are arranged in a staggered (zig-zag) fashion in two rows which are parallel to the pivot axis. As illustrated in FIGS. 14–16, the lower ends of the pins are urged into contact with the flexible insulating board 52. As best shown in FIGS. 15 and 16, the pins 38 in the two rows are L-shaped and are of different heights so that the bent upper ends of the pins are arranged in staggered fashion in parallel upper and lower rows.

Figure 18:
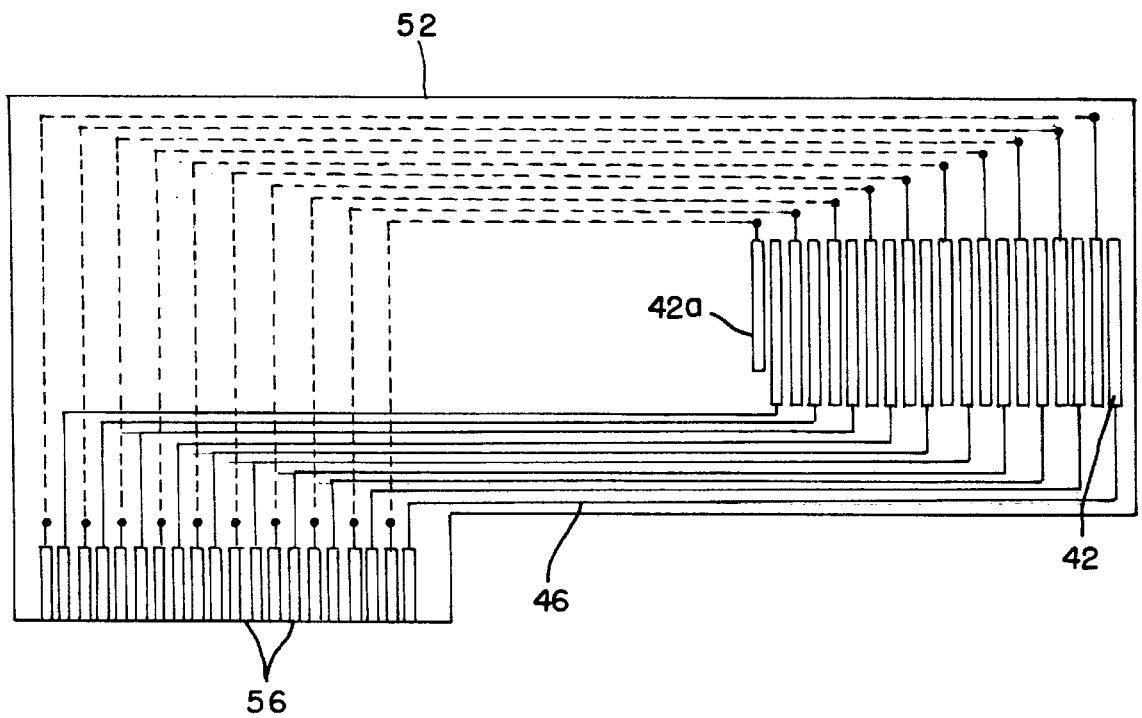
FIG. 18 is a developed view showing a flexible insulating board provided on the shaft shown in FIG. 14.

As shown in FIGS. 14 and 18, on the narrower portion of the flexible insulating board 52 a plurality of thin strip-like parallel electrodes 42 are provided in a row extending in the direction of the pivot axis, and the connector pins 38 are urged into contact with the respective electrodes 42. On the wider portion of the flexible insulating board, a plurality of electrodes 56 are provided along the non-wrapped edge of that portion. These electrodes 56 and the electrodes 42 are electrically interconnected by intermediate conductors 46 of the conductor pattern. Referring to FIG. 18, the dashed lines show conductors 46 provided on the rear surface of the flexible insulating board 52. These conductors 46 are electrically connected to the electrodes 56 and 42 through holes in the flexible insulating board 52. As best shown in FIG. 18, at least one of the electrodes is a reduced length electrode 42a, which is not contacted by the associated connector pin 38 when the second member 54 is at a predetermined pivotal position within the range of pivotal movement of the second member 54 relative to the cylindrical end portion of shaft 32. The electrode 42a and the associated spring-biased pin 38 thus constitute a switch means which interrupts the conductive path between a connector pin 38 and an electrode 56 at a predetermined pivotal position of the second member 54.

As best shown in FIGS. 13 and 14, the shaft 32 is secured at one end to a stationary base 58. A ring 60 made of a suitable insulating material is fitted about the narrower portion of the flexible insulating board 52 which is wrapped 360 degrees about the cylindrical portion of shaft 32 to prevent unwrapping of this portion of flexible insulating board 52 from the shaft.

In the embodiment of the connector shown in FIGS. 13–18, in which the conductor pattern is provided on the flexible insulating board 52, both the front and rear surfaces thereof can be utilized to provide the conductors 46 of the conductor pattern, and it is possible to obtain high density wiring. While the second member 54 pivots relative to the shaft 32, the connector pins 38 are urged into contact with the electrodes 42 and are electrically connected through the electrodes 42 and the conductors 46 of the conductor pattern to the respective electrodes 56. Moreover, since the pins 38 are arranged in a staggered fashion, the wiring density can be further increased, which is especially suited for constructing an electrical connector having a small inter-electrode pitch. As described above, at a predetermined pivotal position of the second member, at least one of the spring-biased pins 38 does not contact, and is not electrically connected to, the associated one of the electrodes 42.

Figure 21:
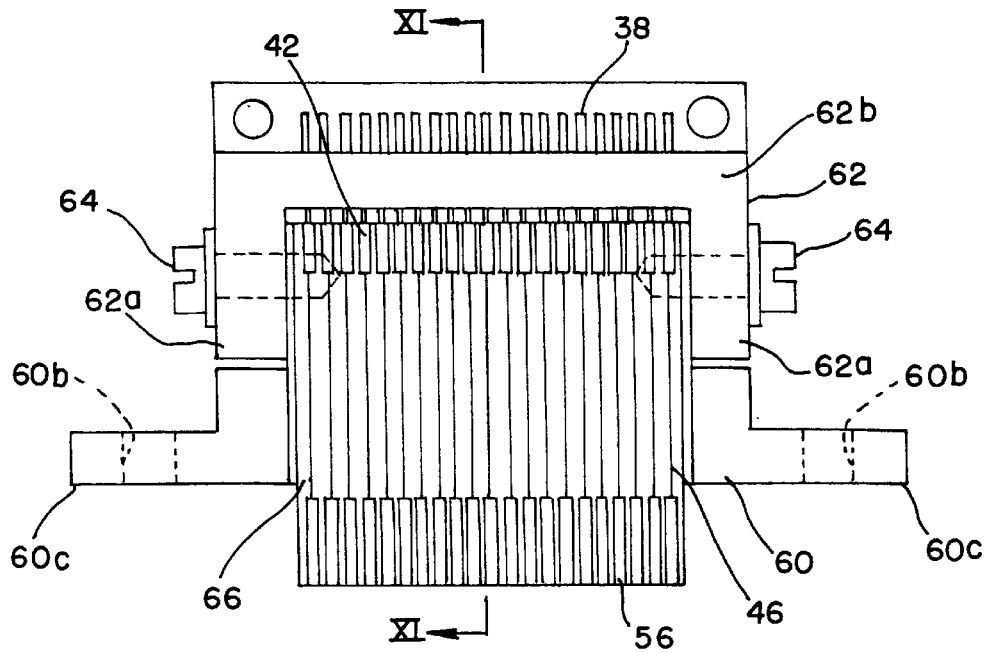
FIG. 21 is a front view showing a another embodiment of the electrical connector according to the present invention.
Figures 22, 23:
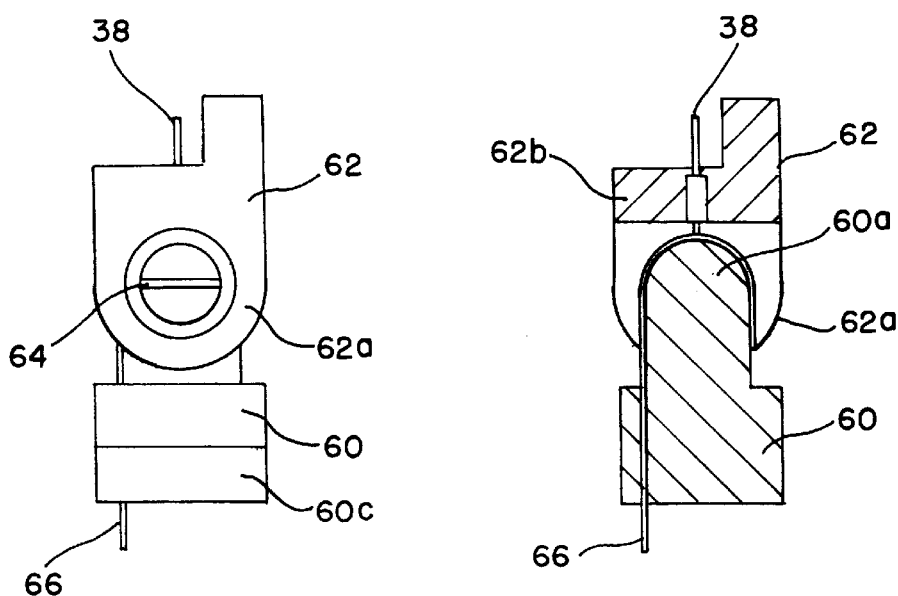
FIG. 22 is a left side view taken in FIG. 21.
FIG. 23 is a sectional view taken along line K—K in FIG. 21.

Another embodiment of the electrical connector according to the present invention will be described with reference to FIGS. 21 to 23. This embodiment does not use the shaft 32. Instead, a first member 60 made of an insulating material includes a frictional contact portion 60a having a convex arcuate sectional profile with respect to the pivot axis, and mounting portions 60c at the opposite ends of the frictional contact portion 60a. The mounting portions 60c each have a mounting hole 60b. A second member 62 has opposite end pivot arm portions 62a, which are coupled by screws 64 for pivotal movement relative to the first member 60, and a pin support portion 62b connecting the two arm portions 62a. The pin support portion 62b supports a plurality of spring-biased electrical connector pins 38, which are arranged in a row along the pivot axis and have their ends urged into contact with the frictional support portion 60a of the first member 60. A flexible insulating board 66 is provided to cover the arcuate part and a front part of the outer periphery of the frictional contact portion 60a of the first member 60. The flexible insulating board 66 has an edge portion depending from the first member 60. A plurality of thin strip-like electrodes 42 are provided on a part of the flexible insulating board 66 on the frictional contact portion 60a such that they are concentric with the pivot axis. The connector pins 38 are urged into contact with the respective electrodes 42. A plurality of electrodes 56 are provided on the depending edge portion of the flexible insulating board 66. The electrodes 42 and 56 are interconnected by conductors 46 of the conductor pattern.

As in the other embodiments, with this construction, while the second member 62 pivots relative to the first member 60, the spring-biased connector pins 38 are held in contact with, and are electrically connected to, the electrodes 42. Thus, the electrical connections are maintained during pivotal movement.

An electronic apparatus using the connector shown in FIGS. 1 to 12, will be described with reference to FIGS. 24 and 25. The frame of the lid 14 of the electronic apparatus is hinged by hinge pins to the frame of the housing 10. The lid 14 can be readily constructed as a unit capable pivotal movement by combining its two longitudinal frame divisions, which pinch the hinge pin. The second member 36 of the connector 30 is secured by means of screws 70 to the lid 14, and the spring-biased connector pins 38 mounted in the second member 36 are electrically connected by appropriate connectors, cables, a flexible insulating board, etc. (not shown) to electronic components assembled in the lid 14. The stationary member 34 of the connector 30 is attached, with some adjustment play, by means of screws 72 to the housing 10 against rotation relative thereto, and the spring-biased connector pins 48 mounted therein are electrically connected to electronic components assembled in the housing 10. The hinge pins of the electronic apparatus are of course aligned with the pivot axis of the connector 30. Furthermore, it is possible to use the connector 30 as the hinge pins of the electronic apparatus.

With the foregoing construction, the second member 36 is pivoted relative to the shaft 32 when the lid 14 is opened and closed. However, unlike a prior art note-type electronic apparatus, no cable is twisted and no electric interconnection is broken apart, thus extending the life of the apparatus.

Figure 24:
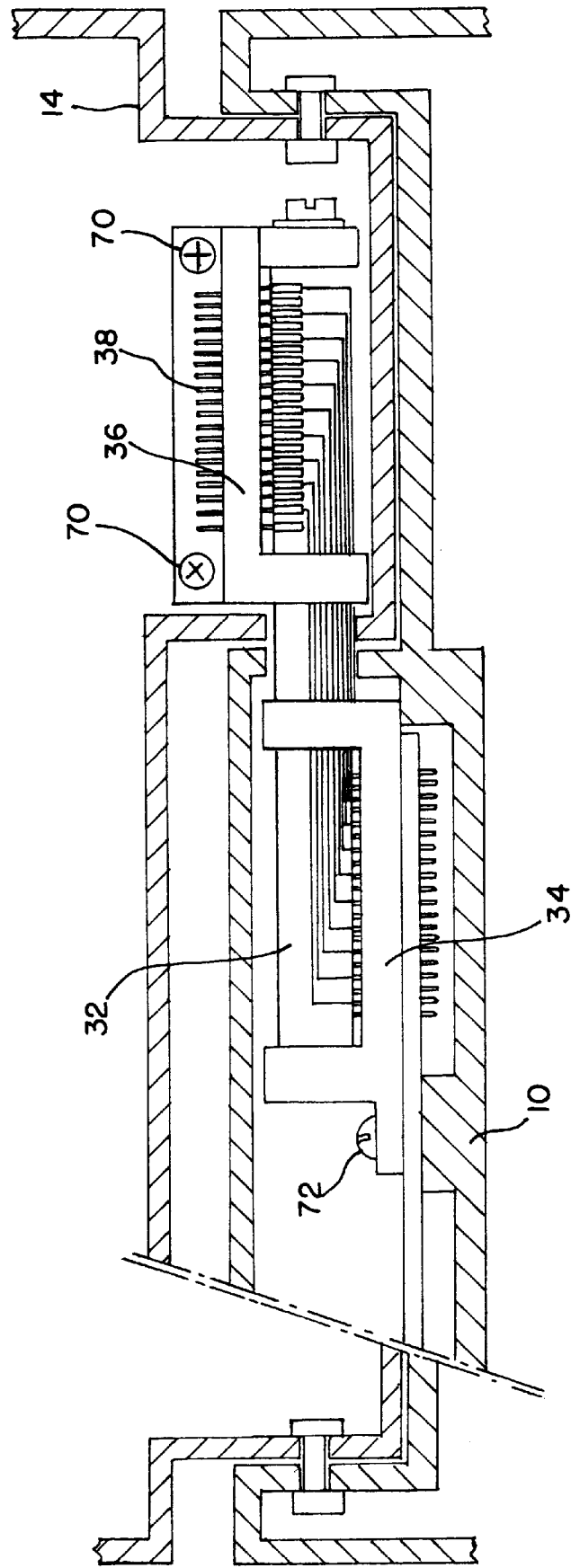
FIG. 24 is a fragmentary sectional view showing an electronic apparatus using the electrical connector shown in FIGS. 1 to 12, the connector being shown mounted in recesses formed in a housing and a lid of the electronic apparatus.
Figure 25:
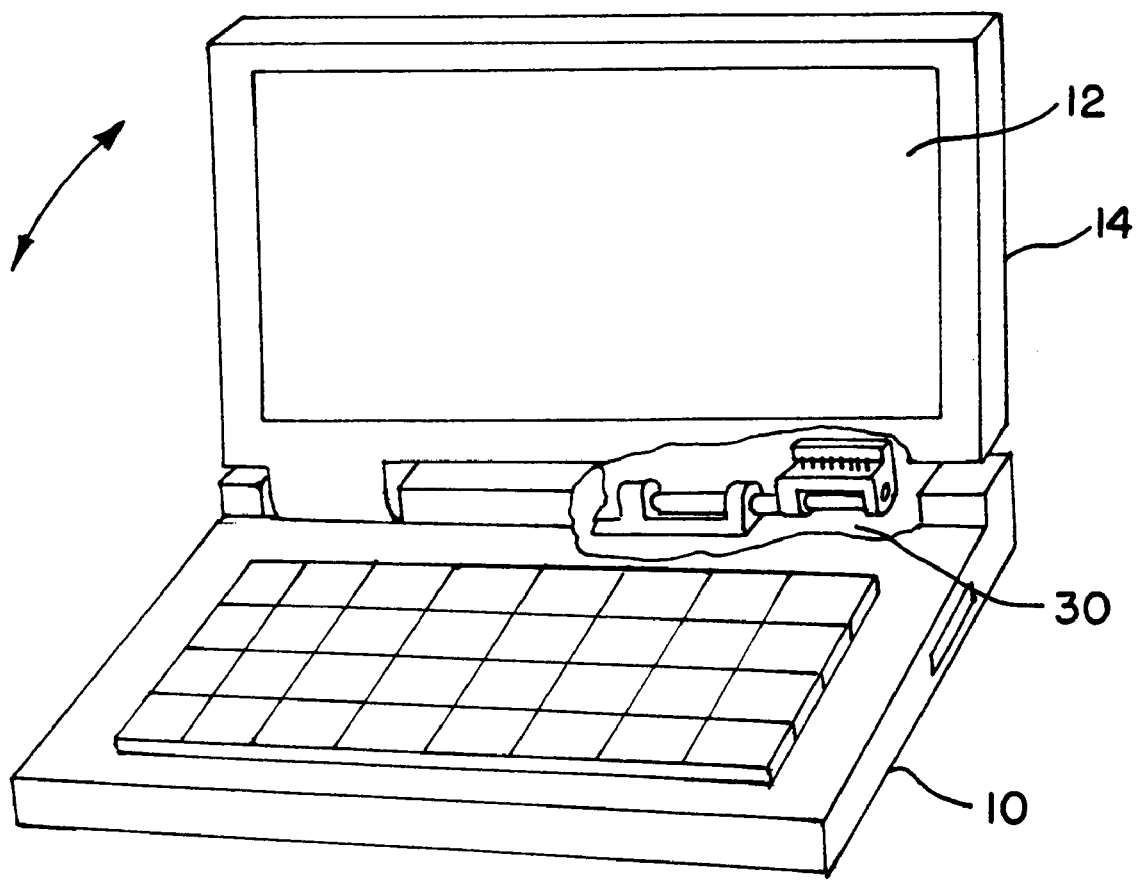
FIG. 25 is a perspective view, partly broken away, of the electronic apparatus shown in FIG. 24.

Although not shown in the electronic apparatus shown in FIGS. 24 and 25, when the connector shown in FIGS. 13 to 18 is used, the reduced length electrode 42a and the associated connector pin 38 may constitute a power on-off switching means; that is, this connector pin 38 is not in contact with the reduced length electrode 42a in the closed state of the lid 14. It is thus possible to dispense with the power switch provided in the prior art electronic apparatus.

In the embodiment of the connector shown in FIGS. 1 to 12, the second member 36 is capable of pivoting in a range of 180 degrees, i.e., 90 degrees in each of the forward and rearward directions. It is possible, however, to achieve a larger pivoting range. In the embodiment of the connector as shown in FIGS. 13 to 18, it is possible to provide a pivoting or rotating range of 360 degrees by providing the electrodes 42 on the front surface of the flexible insulating board 52 while providing the conductors 46 on the rear surface. The first member is not limited to being a cylindrical shaft 32 or one having a substantially U-shaped sectional profile; it may have any outer shape so long as it includes a portion having a convex arcuate sectional profile with respect to the pivot axis. The shaft 32 used as the first member may be made of a conductive material so long as it does not cause short circuits between any of the electrodes 42 and 44 and the conductors 46. For example, it is possible to use a metal shaft with a surface coating of an insulating material. Also, instead of providing the electrodes 42 on the convex arcuate outer surface of the first member, it is possible to provide the first member with an array of conductor pins, each of which have a convex arcuate end surface with respect to the pivot axis and serve as an electrode which is engaged by an associated spring-biased connector pin. Specific examples of such a conductor pin shape are a round pin having a semi-spherical end, a rectangular column pin with a semi-circular end, and a rod with a half disc provided at an end like a mushroom. Where such pins with an end having a convex arcuate sectional profile are used, it is possible to form a connection-breaking means by providing an insulating material on a pin at a predetermined location, at which the associated spring-biased connector pin is held in forced contact at a predetermined pivotal position.

What is claimed is:

1. An electrical connector comprising:
   a first member;
   a second member mounted for pivotal movement relative to the first member about a pivot axis;
   a plurality of mutually insulated first electrodes provided on a flexible insulating board carried by the first member, the insulating board being curved so as to impart to the first electrodes a convex arcuate profile which is concentric with the pivot axis; and a plurality of electrical contacts provided on the second member, each of the electrical contacts having an element thereof which is urged into engagement with one of the first electrodes.

2. The electrical connector as recited in claim 1, wherein the first electrodes are disposed in a row which is generally aligned with the pivot axis.

3. The electrical connector as recited in claim 1, and further comprising switch means for interrupting engagement between at least one of the first electrodes and any of the electrical contact elements upon pivotal movement of the second member to a predetermined position relative to the first member, to thereby preclude an electrical connection between the at least one first electrode and any of the electrical contacts.

4. The electrical connector as recited in claim 1, wherein:
the first member includes a peripheral surface having a convex arcuate profile which is concentric with the pivot axis;
at least a first portion of the insulating board is wrapped about the peripheral surface; and
the first electrodes comprise mutually insulated thin conductors disposed on the first portion of the insulating board.

5. The electrical connector as recited in claim 4, wherein:
the insulating board includes a non-wrapped second portion;
a plurality of mutually insulated second electrodes are provided on the second portion of the insulating board; and
a plurality of intermediate conductors are provided on the insulating board, the intermediate conductors extending between and electrically connecting the first and second electrodes.

6. The electrical connector as recited in claim 5, wherein:
the first electrodes are provided on a first side of the insulating board;
a first group of the intermediate conductors are provided on the first side of the insulating board;
a second group of the intermediate conductors are provided on a second side of the insulating board which is opposite to the first side; and
alternating ones of the first and second electrodes are electrically connected by intermediate conductors of the first and second groups, respectively.

7. The electrical connector as recited in claim 1, wherein:
the plurality of electrical contacts are disposed in a row which is generally aligned with the pivot axis; and
alternating ones of the electrical contacts are transversely staggered with respect to the pivot axis.

8. The electrical connector as recited in claim 7, wherein alternating ones of the electrical contacts are of different height in a direction away from the pivot axis.

9. The electrical connector as recited in claim 1, wherein:
the first member comprises a shaft with a secured first end and a cantilevered second end which includes a cylindrical peripheral surface;
at least a first portion of the insulating board is wrapped about the cylindrical peripheral surface;
the first electrodes comprise mutually insulated thin conductors disposed on the first portion of the insulating board; and
the second member is carried on the shaft adjacent to the second end thereof for pivotal movement about the cylindrical peripheral surface.

10. The electrical connector as recited in claim 3, wherein:
each of the first electrodes comprises a thin conductor having an arcuate extent about the pivot axis; and
the switch means comprises one of the first electrodes which has a reduced arcuate extent compared to the other ones of the first electrodes.

11. An electrical connector comprising:
a first member comprising a shaft with a secured first end and a cantilevered second end which includes a cylindrical peripheral surface;
a second member mounted on the shaft adjacent to the second end thereof for pivotal movement relative to the first member about the cylindrical peripheral surface;
a plurality of mutually insulated first electrodes disposed about the cylindrical peripheral surface of the shaft, each of the first electrodes having a convex arcuate profile which is concentric with the cylindrical peripheral surface; and
a plurality of electrical contacts provided on the second member, each of the electrical contacts having an element thereof which is urged into engagement with one of the first electrodes.

12. The electrical connector as recited in claim 11, wherein the first electrodes are disposed in a row which is generally aligned with the pivot axis.

13. The electrical connector as recited in claim 11, wherein the first electrodes comprise thin conductors disposed on the cylindrical peripheral surface of the shaft.

14. The electrical connector as recited in claim 13, wherein the peripheral surface is covered by an insulating material, and the first electrodes are provided on the insulating material.

15. The electrical connector as recited in claim 13, wherein:
the plurality of electrical contacts are disposed in a row which is generally aligned with the pivot axis; and
alternating ones of the electrical contacts are transversely staggered with respect to the pivot axis.

16. The electrical connector as recited in claim 15, wherein alternating ones of the electrical contacts are of different height in a direction away from the pivot axis.

17. The electrical connector as recited in claim 11, wherein a plurality of mutually insulated second electrodes are provided on the first end of the shaft, the second electrodes being electrically connected to the first electrodes by intermediate conductors provided on the shaft.

18. The electrical connector as recited in claim 11, and further including switch means for interrupting engagement between at least one of the first electrodes and any of the electrical contact elements upon pivotal movement of the second member to a predetermined position relative to the first member, to thereby preclude an electrical connection between the one first electrode and any of the electrical contacts.

19. The electrical connector as recited in claim 15, wherein:
each of the first electrodes comprises a thin conductor having an arcuate extent about the pivot axis; and
the switch means comprises one of the first electrodes which has a reduced arcuate extent compared to the other ones of the first electrodes.

20. An electrical connector comprising:
a first member;
a second member mounted for pivotal movement relative to the first member about a pivot axis;

a plurality of mutually insulated first electrodes provided on the first member, each of the first electrodes having a convex arcuate profile which is concentric with the pivot axis;

a plurality of electrical contacts provided on the second member, each of the electrical contacts having an element thereof which is urged into engagement with one of the first electrodes; and switch means for interrupting engagement between at least one of the first electrodes and any of the electrical contact elements upon pivotal movement of the second member to a predetermined position relative to the first member, to thereby preclude an electrical connection between the one first electrode and any of the electrical contacts.

21. The electrical connector as recited in claim 20, wherein:

each of the first electrodes comprises a thin conductor having an arcuate extent about the pivot axis; and the switch means comprises one of the first electrodes which has a reduced arcuate extent compared to the other ones of the first electrodes.

22. An electronic apparatus comprising a housing accommodating first electronic components and a lid accommodating other electronic components, the lid being hinged to the housing for opening and closing movement about a hinge axis, and an electrical connector for effecting electrical connections between the first electronic components and the other electronic components, the electrical connector comprising:

a first member fastened to the housing, the first member comprising a shaft with a secured first end and a cantilevered second end which includes a cylindrical peripheral surface;

a second member fastened to the housing, the second member being mounted on the shaft adjacent to the second end thereof for pivotal movement relative to the first member about the cylindrical peripheral surface;

a plurality of mutually insulated first electrodes disposed about the cylindrical peripheral surface of the shaft, each of the first electrodes having a convex arcuate profile which is concentric with the cylindrical peripheral surface;

means for electrically connecting the first electrodes to the first electronic components;

a plurality of electrical contacts provided on the second member, each of the electrical contacts having an element thereof which is urged into engagement with one of the first electrodes; and means for electrically connecting the second electrodes to the other electronic components.

23. The electronic apparatus as recited in claim 22, wherein the first electrodes are disposed in a row which is generally aligned with the pivot axis.

24. The electronic apparatus as recited in claim 22, wherein the first electrodes comprise thin conductors disposed on the cylindrical peripheral surface of the shaft.

25. The electronic apparatus as recited in claim 24, wherein the peripheral surface is covered by an insulating material, and the first electrodes are provided on the insulating material.

26. The electronic apparatus as recited in claim 22, wherein the lid is hinged to the housing by the electrical connector.

27. The electronic apparatus as recited in claim 22, and further comprising:

an electrical power circuit which includes one of the first electrodes and one of the electrical contacts; and switch means for interrupting engagement between the one first electrode and the one electrical contact upon movement of the lid to a closed position, to thereby preclude an electrical connection between the one first electrode and the one electrical contact and render the power circuit open.

* * * * *